United States Patent
Bhattacharyya et al.

(10) Patent No.: US 9,375,684 B2
(45) Date of Patent: Jun. 28, 2016

(54) GREEN SYNTHESIS NANOCOMPOSITE MEMBRANES

(75) Inventors: Dibakar Bhattacharyya, Lexington, KY (US); Vasile Smuleac, Lexington, KY (US); Rajender S. Varma, Cincinnati, OH (US); Subhas K. Sikdar, Cincinnati, OH (US)

(73) Assignee: THE UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 548 days.

(21) Appl. No.: 13/459,315

(22) Filed: Apr. 30, 2012

(65) Prior Publication Data

US 2013/0062279 A1    Mar. 14, 2013

Related U.S. Application Data

(60) Provisional application No. 61/532,873, filed on Sep. 9, 2011.

(51) Int. Cl.

| C02F 1/66 | (2006.01) |
|---|---|
| B01D 67/00 | (2006.01) |
| B82Y 30/00 | (2011.01) |
| B82Y 40/00 | (2011.01) |
| B01D 69/10 | (2006.01) |
| B01D 71/40 | (2006.01) |
| B01D 71/02 | (2006.01) |
| B01D 71/34 | (2006.01) |
| B01D 71/44 | (2006.01) |
| C02F 1/00 | (2006.01) |
| C02F 1/70 | (2006.01) |

(52) U.S. Cl.
CPC ............ *B01D 69/10* (2013.01); *B01D 67/0079* (2013.01); *B01D 67/0088* (2013.01); *B01D 67/0093* (2013.01); *B01D 71/40* (2013.01); *B01D 71/022* (2013.01); *B01D 71/34* (2013.01); *B01D 71/44* (2013.01); *B01D 2323/30* (2013.01); *B01D 2323/40* (2013.01); *B82Y 30/00* (2013.01); *B82Y 40/00* (2013.01); *C02F 1/001* (2013.01); *C02F 1/70* (2013.01)

(58) Field of Classification Search
None
See application file for complete search history.

(56) References Cited

U.S. PATENT DOCUMENTS

| 5,049,275 A | * | 9/1991 | Gillberg-LaForce et al. .................. 210/500.27 |
|---|---|---|---|
| 5,420,047 A | * | 5/1995 | Brandt et al. .................. 435/7.9 |
| 6,054,085 A | | 4/2000 | Peer et al. |
| 6,113,798 A | | 9/2000 | Dhalluin et al. |

(Continued)

FOREIGN PATENT DOCUMENTS

WO    WO 2009140694 A2 * 11/2009

OTHER PUBLICATIONS

Maximous, N., et al. Preparation, characterization and performance of Al2O3/PES membrane for wastewater filtration. Journal of Membrane Science, 341 (2009) 67-75.*

(Continued)

*Primary Examiner* — David C Mellon
*Assistant Examiner* — Ryan B Huang
(74) *Attorney, Agent, or Firm* — King & Schickli, PLLC (57) ABSTRACT

A nanocomposite membrane includes a macroporous polymer membrane having a plurality of pores. A plurality of metal nanoparticles are synthesized and immobilized within those plurality of pores. The nanoparticles are reduced and capped with a green reducing and capping agent such as green tea extract.

20 Claims, 12 Drawing Sheets

(56) References Cited

U.S. PATENT DOCUMENTS

| | | | |
|---|---|---|---|
| 7,963,720 | B2 | 6/2011 | Hoag et al. |
| 8,029,857 | B2 | 10/2011 | Hoek et al. |
| 8,057,682 | B2 | 11/2011 | Hoag et al. |
| 8,313,797 | B2* | 11/2012 | Mack et al. .................. 427/132 |
| 2006/0046297 | A1 | 3/2006 | Ball |
| 2007/0272613 | A1 | 11/2007 | Minhas et al. |
| 2008/0214687 | A1 | 9/2008 | Muller et al. |
| 2009/0230053 | A1 | 9/2009 | Mullette |
| 2010/0025330 | A1 | 2/2010 | Ratto et al. |
| 2010/0200501 | A1* | 8/2010 | Hoag et al. .................. 210/620 |
| 2010/0243556 | A1 | 9/2010 | Kools et al. |
| 2010/0264358 | A1* | 10/2010 | Mack et al. ................ 252/62.55 |
| 2011/0017661 | A1 | 1/2011 | Kosar |
| 2011/0165406 | A1 | 7/2011 | Burger et al. |
| 2011/0210064 | A1 | 9/2011 | Cheng et al. |

OTHER PUBLICATIONS

IUPAC. Compendium of Chemical Terminology, 2nd ed. (the "Gold Book"). Compiled by A. D. McNaught and A. Wilkinson. Blackwell Scientific Publications, Oxford (2006-) created by M. Nic, J. Jirat, B. Kosata; updates compiled by A. Jenkins. ISBN 0-9678550-9-8. doi:10.1351/goldbook.*

Ying, L., et al. Synthesis and characterization of poly(acrylic acid)-graft-poly(vinylidene fluoride) copolymers and pH-sensitive membranes. Macromolecules, 35 (2002) 673-679.*

N. Maximous, G. Nakhla, W. Wan, K. Wong. Preparation, characterization and performance of Al2O3/PES membrane for wastewater filtration. Journal of Membrane Science 341, 2009, 67-75.*

Bruce J. Hinds et al.; "Aligned Multiwalled Carbon Nanotube Membranes"; Science, vol. 303, pp. 62-65; Jan. 2, 2004.

Emad Tajkhorshid et al.; "Control of the Selectivity of the Aquaporin Water Channel Family by Global Orientational Tuning"; Science, vol. 296, pp. 525-530; Apr. 19, 2012.

Punit Kohli et al.; "DNA-Functionalized Nanotube Membranes with Single-Base Mismatch Selectivity"; Science, vol. 305, pp. 984-986; Aug. 13, 2004.

Yueqiang Liu et al.; "Effect of Particle Age (Fe0 Content) and Solution pH on NZVI Reactivity: H2 Evolution and TCE Dechlorination"; Environmental Science & Technology, vol. 40, No. 19, pp. 6085-6090; Aug. 30, 2006.

Olli Ikkala et al.; "Functional Materials Based on Self-Assembly of Polymeric Superamolecules"; Science, vol. 295, pp. 2407-2409; Mar. 29, 2002.

Gero Decher; "Fuzzy Nanoassemblies: Toward Layered Polymeric Multicomposites"; Science, vol. 277, pp. 1232-1237; Aug. 29, 1997.

V. Smuleac et al.; "Green synthesis of Fe and Fe/Pd bimetallic nanoparticles in membranes for reductive degradation of chlorinated organics"; Journal of Membrane Science, vol. 379, pp. 131-137; May 2011.

E.M. Gabriel et al.; "In Situ Modification of Microporous Membranes"; Journal of Applied Polymer Science, vol. 48, pp. 2081-2090; Jun. 20, 1993.

Nathaniel L. Rosi et al.; "Oligonucleotide-Modified Gold Nanoparticles for Intracellular Gene Regulation"; Science, vol. 312, pp. 1027-1030; May 19, 2006.

Feng Tao et al.; "Reaction-Driven Restructuring of Rh-Pd and PT-Pd Core-Shell Nanoparticles"; Science, col. 322, pp. 932-934; Nov. 7, 2008.

Jay M. Thompson, et al.; "Reductive Dechlorination of Chloroacetanilide Herbicied (Alachlor) Using Zero-Valent Iron Nanoparticles"; Environmental Engineering Science, vol. 27, pp. 227-232; No. 3; Jan. 11, 2010.

Daxiong Fu et al.; "Structure of a Glycerol-Conducting Channel and the Basis for Its Selectivity"; Science, vol. 290, pp. 481-486; Oct. 20, 2000.

Yueqiang Liu et al.; "TCE Dechlorination Rates, Pathways, and Efficiency of Nanoscale Iron Particles with Different Properties"; Environmental Science & Technology, vol. 39, No. 5, pp. 1338-1345; Jan. 6, 2005.

Wei-xian Zhang et al.; "Treatment of chlorinated organic contaminants with nanoscale bimetallic particles"; Elsevier Science B.V.; Catalysis Today, vol. 40, pp. 387-395; 1998.

T.C. Merkel et al.; "Ultrapermeable, Reverse-Selective Nanocomposite Membranes"; Science, vol. 296, pp. 519-522; Apr. 19, 2002.

* cited by examiner

FIG. 1a

AA – acrylic acid
EG – ethylene glycol, cross-linking agent
KPS – potassium persulfate, initiator PAA – polyacrylic acid
PVDF – polyvinylidene fluoride

GREEN SYNTHESIS NANOCOMPOSITE MEMBRANES

This utility patent application claims the benefit of priority in U.S. Provisional Patent Application Ser. No. 61/532,873 filed on 9 Sep. 2011, the full disclosure of which is incorporated herein by reference.

This invention was made with at least partial government support under NIEHS contract no. P4ZES007380. The government may have certain rights in this invention.

TECHNICAL FIELD

This document relates generally to membrane technology and membrane synthesis and, more particularly, to a nanocomposite membrane incorporating metal nanoparticles synthesized in-situ in the pores of the membrane via green synthesis techniques.

BACKGROUND SECTION

This document describes porous polymer membranes including metal nanoparticles synthesized and immobilized in-situ within the pores of the membrane while simultaneously being reduced and capped with a green reducing and capping agent. Advantageously, the resulting nanoparticles are protected from oxidation and agglomeration and thereby provide more efficient and effective reductive degradation of toxic chlorinated organic compounds and other target contaminants or pollutants of a water supply.

SUMMARY SECTION

A nanocomposite membrane comprises a macroporous polymer membrane including a plurality of pores. A plurality of metal nanoparticles are synthesized and immobilized in-situ within that plurality of pores. Further the nanoparticles are reduced and capped with a green tea reducing and capping agent. Each nanoparticle has a size of between about 30 nm and about 70 nm. Further between about 70% and about 80% of the nanoparticles that are immobilized on the membrane are inside the pores. The metal nanoparticles may be made from a number of different metal salts resulting in, for example, iron (Fe) nanoparticles, iron/palladium (Fe/Pd) bimetallic nanoparticles, iron/nickel (Fe/Ni) bimetallic nanoparticles, iron/copper (Fe/Cu) bimetallic nanoparticles, iron/platinum (Fe/Pt) bimetallic nanoparticles, iron/silver (Fe/Ag) bimetallic nanoparticles and mixtures thereof.

The polymer membrane may be made from a material selected from a group consisting of polyacrylic acid-modified polyvinylidene fluoride (PAA/PVDF), polysulfone, cellulose-based materials and polycarbonate. Typically the pores have a diameter of between about 100 nm and 700 nm. Further the green reducing and capping agent may be selected from a group consisting of green tea extract, polyphenol, epicatechin, epicatechin gallate, epigallocatechin, rutin, tannic acid, D-glucose, glutathione, ascorbate, kaempferol, quercetin, myricetin, maltose and mixtures thereof. In one particularly useful embodiment, the green reducing and capping agent comprises green tea extract.

In accordance with an additional aspect, the nanocomposite membrane comprises a macroporous polymer membrane including a plurality of pores where those plurality of pores incorporate metal nanoparticles synthesized and immobilized within the pores. More specifically, the nanocomposite membrane is made by directly synthesizing and immobilizing the nanoparticles in-situ in the plurality of pores using the green reducing and capping agent while operating in diffusion or convection modes.

In accordance with yet another aspect, a method of preparing a nanocomposite membrane comprises synthesizing and immobilizing a plurality of metal nanoparticles in-situ in a plurality of pores of a macroporous membrane using a green reducing and capping agent. Metal cations from the precursor salts are immobilized by ion exchange on the membrane and the reducing agent (i.e. tea extract) is passed through the membrane pores in convective or diffusive modes, resulting in the in situ formation of metal nanoparticles.

BRIEF DESCRIPTION OF THE DRAWINGS

The accompanying drawings incorporated herein and forming a part of the specification, illustrate several aspects of the nanocomposite membrane and together with the description serve to explain certain principles of the invention. In the drawings.

Reference will now be made in detail to the present preferred embodiments of nanocomposite membranes, examples of which are illustrated in the accompanying drawings.

DETAILED DESCRIPTION

Figure 1A:
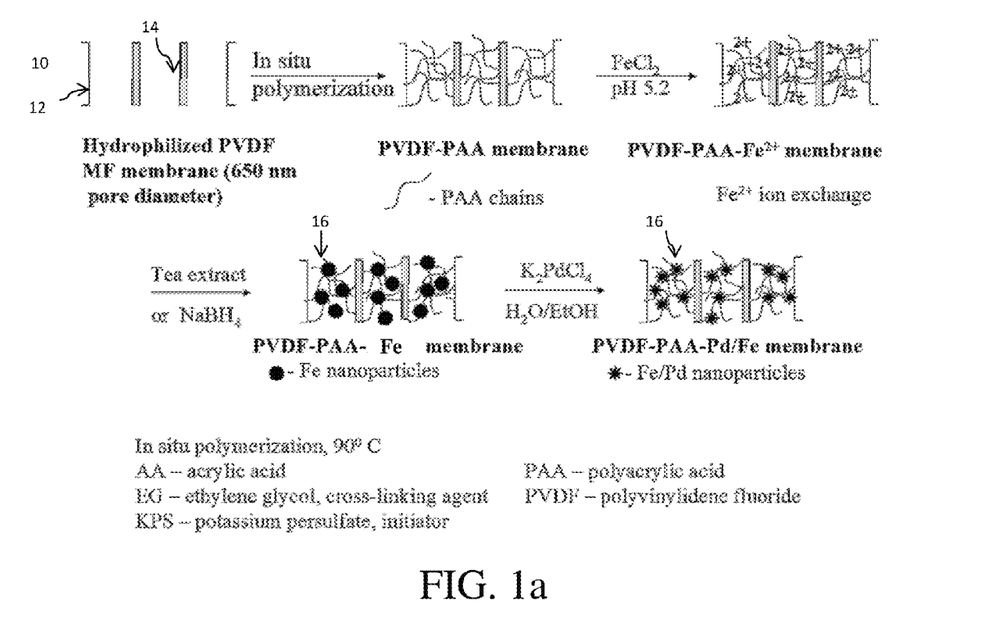
FIGS. 1A and 1B are schematical illustrations for two different methods for the preparation of the nanocomposite membranes of the present invention.
Figure 1B:
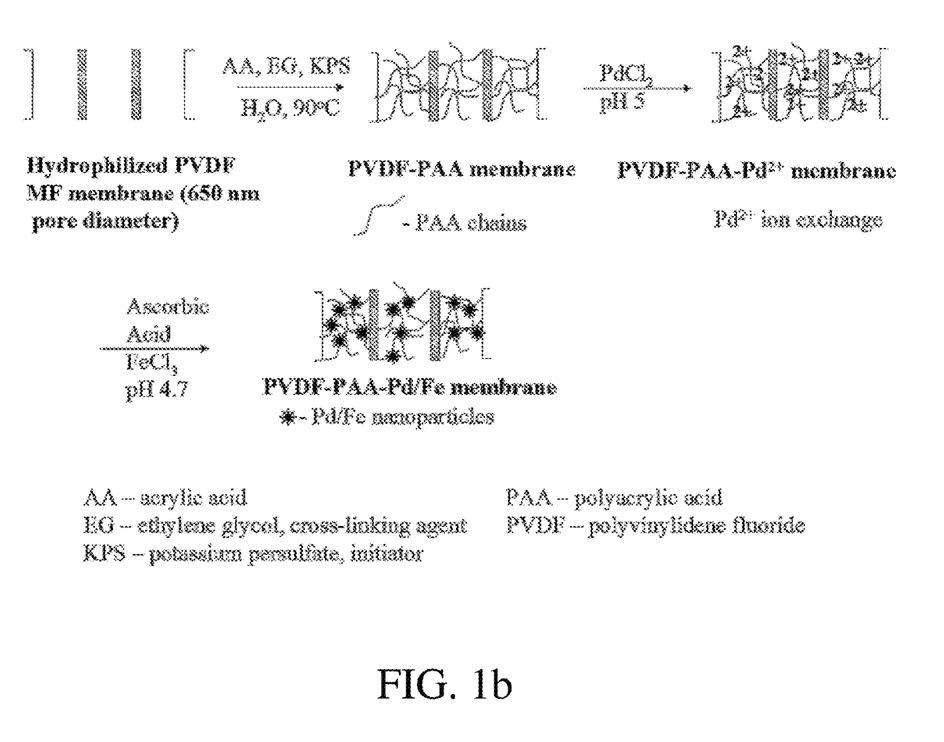
Figure 2:
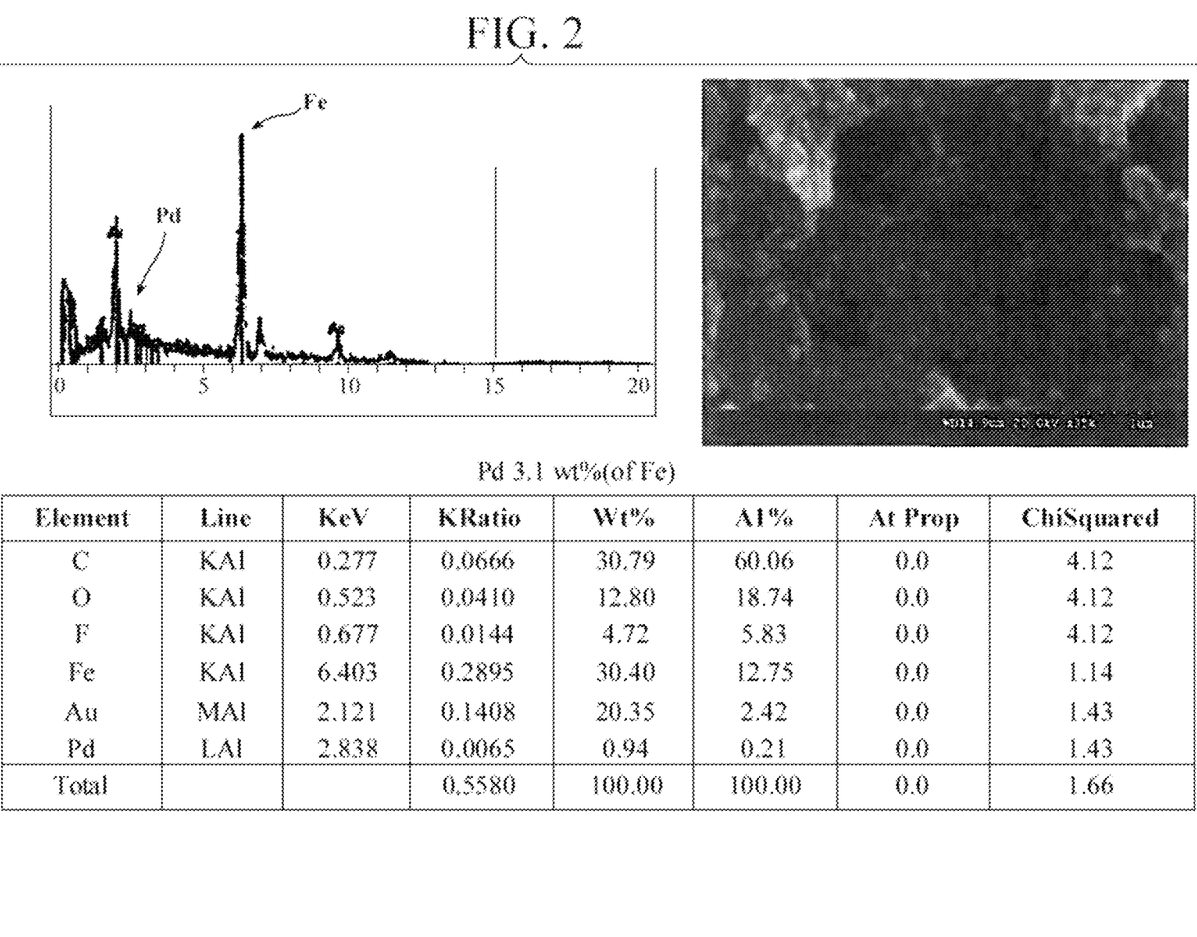
FIG. 2 is a SEM and EDX for Fe/Pd nanoparticles reduced with ascorbic acid.

Reference is now made to FIGS. 1A and 1B which schematically illustrate two different methods for making a nanocomposite membrane apparatus 10 comprising a macroporous polymer membrane 12 including a plurality of pores 14. A plurality of metal nanoparticles 16 are synthesized and immobilized within the pores 14. In the method illustrated in FIG. 1A, the nanoparticles 16 are reduced and capped with a green reducing and capping agent, such as green tea extract, in a manner described in greater detail below. In the method illustrated in FIG. 1B, the nanoparticles are reduced with ascorbic acid.

The nanoparticles 16 have a size of between about 30 nm and about 70 nm. Further between about 70% and about 80% of the nanoparticles 16 immobilized on the membrane 12 are inside the pores 14. The metal nanoparticles may be monometallic and/or bimetallic. Examples include Fe monometallic nanoparticles, Fe/Pd bimetallic nanoparticles, Fe/Ni bimetallic nanoparticles, Fe/Cu bimetallic nanoparticles, Fe/Pt bimetallic nanoparticles, Fe/Ag bimetallic nanoparticles and mixtures thereof.

The macroporous polymer membrane 12 may be made from a material selected from a group consisting of polyacrylic acid-modified polyvinylidene fluoride (PAA/PVDF), polysulfone, cellulose-based materials and polycarbonate. Typically the pores 14 have diameters of between about 100 nm and 700 nm. The green reducing and capping agent green tea extract, may be selected from a group consisting of, green tea extract, polyphenol, epicatechin, epicatechin gallate, epigallocatechin, rutin, tannic acid, D-glucose, glutathione, ascorbate, kaempferol, quercetin, myricetin, maltose and mixtures thereof. In one particularly useful embodiment, the reducing and capping agent is green tea extract comprising green tea derived polyphenols. Significantly, it should be appreciated that the metal nanoparticles are directly synthesized and immobilized in-situ in the pores using the green reducing and capping agent by immersion, convection or diffusion. Diffusion mode allows for the most selective in-situ synthesis of nanoparticles within the pores.

The method of preparing the nanocomposite membrane 10 may be broadly described as comprising the synthesizing and immobilizing of a plurality of metal nanoparticles 16 in-situ in a plurality of pores 14 of a macroporous polymer membrane 12 using a green reducing and capping agent. More specifically, metal cations from the precursor salts are immobilized on the membrane by ion exchange, the reducing and capping agent, such as tea extract is passed through the membrane pores 14 and nanoparticles are formed in-situ in the membrane 12. In accordance with this approach it is possible to immobilize at least 70% of the nanoparticles immobilized on the membrane 12 within the pores 14.

The macroporous polymer membrane 12 functions as a platform or support for immobilizing the metal nanoparticles 16. The metal nanoparticles 16 are synthesized within the pores 14 and membrane 12 with green reducing agents which by definition, are nontoxic, and biodegradable. The resulting nanocomposite membranes 10 provide enhanced reactivity and excellent chemical processing performance. The direct in-situ synthesis of bimetallic Fe/Pd nanoparticles into a PAA-functionalized PVDF membrane is illustrated in FIG. 1A.

Prior to $Fe^{2+}$ ion exchange, PAA-functionalized PVDF membranes are immersed in NaCl (5-10 wt %) solution at pH 10 (adjusted with 0.1 M NaOH) for at least 3 h to convert the —COOH to COONa form. The membrane is then washed with DIUF to the neutral pH. Then, the membrane is immersed in $FeCl_2$ solution (200 mL and 180 mg/L $Fe^{2+}$) at a pH of 5.5 (adjusted with 0.1 M NaOH) for 4 h. Nitrogen gas is bubbled to minimize $Fe^{2+}$ oxidation. The $Fe^{2+}$-modified membrane is then immersed in green tea extract (50 ml, 20 g/L) at pH 5. This ensures the formation of Fe nanoparticles. For the Fe/Pd bimetallic nanoparticles, the secondary metal, Pd, is deposited on the Fe nanoparticles (post-coating) by immersing the membrane in a $K_2PdCl_4$ solution (20 mL, 25 mg/L Pd), in closed vials with vigorous shaking.

An alternative approach is illustrated in FIG. 1B. Prior to ion exchange, PAA-functionalized PVDF membranes are immersed in NaCl (5 to 10% wt) solution at pH 10 for at least 3 h to convert the —COOH to COONa form. In the next step, the membrane is washed with DIUF until the pH of the washing solution becomes neutral. Then, the membrane is immersed in $PdCl_2$ solution at a pH of 4.7 for 3 h. Typically feed solution volume and concentration are 50 mL and 20 mg/L $Pd^{2+}$, respectively. Nitrogen gas is bubbled to minimize oxidation. The reduction with ascorbic acid 50 ml, 0.1M) in the presence of $FeCl_3$ (180 mg/L Fe) ensured Fe/Pd bimetallic nanoparticles formation.

Figure 3A:
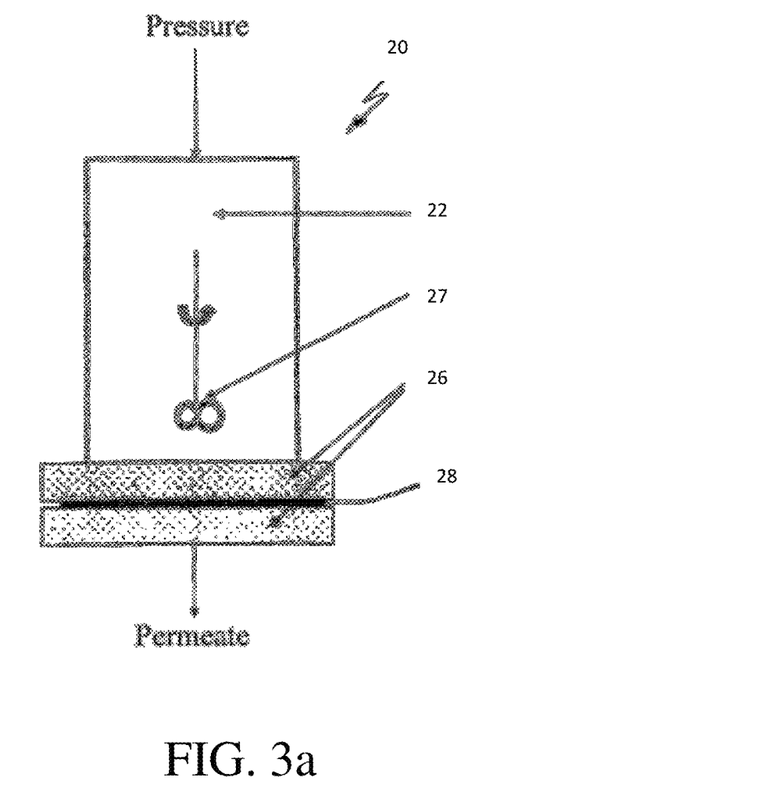
FIG. 3a illustrates a convective flow apparatus for nanoparticle synthesis in a PAA/PVDF membrane.

In addition to the immersion approach discussed above, PAA-functionalized PVDF membranes may be processed in convective mode utilizing a convective flow apparatus 20 as illustrated in FIG. 3a. Such as apparatus 20 includes a feed chamber 22 including a stirrer 27. The PAA/PVDF membrane 28 is held in a membrane holder 26 comprising a pair of plates. Pressure is applied to the system to force permeate solution into and through the pores of the membrane 28.

More specifically, The PAA/PVDF membrane is mounted in a membrane filtration cell and a solution of $FeCl_2$ (0.2 L of 3.2 mM $Fe^{2+}$) at pH 5.2 is filled in a feed chamber and permeated through the membrane. Ion exchange of iron occurs. Next, the reducing agent solution is permeated through the membrane to convert $Fe^{2+}$ to $Fe^0$ nanoparticles. In order to make bimetallic nanoparticles a solution of a secondary metal (0.02 L of 0.24 mM $Pd^{2+}$) is permeated through the membrane and deposited by post-coating. Again, the membrane is washed with water between steps. In order to form Pd nanoparticles only, if the precursor is $K_2PdCl_4$, the PAA-coated PVDF (negatively charged membrane) can be modified using the well established Layer-by-Layer technique with a positively charged polymer (i.e. polyallylamine hydrochloride, PAH or poly lysine, PLL); $PdCl_4^{2-}$ can be easily incorporated by ion exchange and reduced with one of the reducing agents mentioned above. In a specific example, PAA-coated PVDF membrane is mounted in the apparatus shown in FIG. 3a, 0.05 L of 0.02 mM PAH (58000 MW) is permeated through the membrane, which becomes overall positively charged (amine groups from PAH are in 300% excess compared to carboxyl groups of PAA). Next 0.02 L of solution containing 1.46 mM Pd2+ at pH 4.2 is convectively ion exchanged on the membrane and reduced with a solution of epicatechin (0.06 L, 1.55 mM, molar ratio 3:1 compared to Pd2+ to ensure complete reduction of all Pd2+) at 600 C and pH 4.3. During this process the membrane changes color from white to dark brown/black indicating formation of Pd nanoparticles.

Using the convective flow procedure, the nanoparticles are formed both on the external membrane area and inside the membrane pores. Nanoparticle formation on the external surface can be avoided if the membrane is coated with PAA only in the pores. The main variable in convective flow processing is the permeated flux through the membrane, which can be modulated by changing pressure.

Figure 3B:
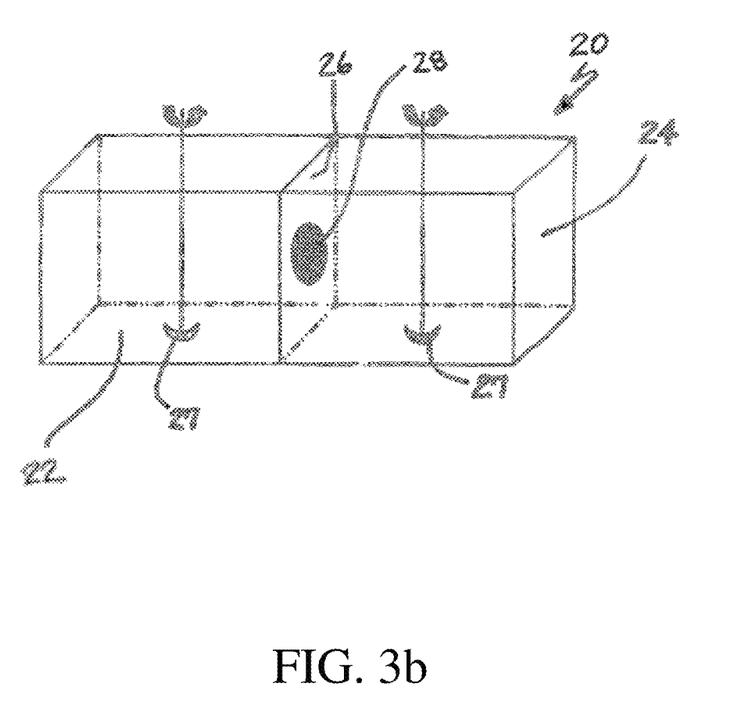
FIG. 3b illustrates a diffusion cell for the synthesis and immobilization of the metal nanoparticles in-situ within the pores of a membrane.

In yet another approach, PAA-functionalized PVDF membranes may be processed in diffusion mode utilizing a diffusion cell 20 as illustrated in FIG. 3b. The diffusion cell 20 includes two chambers 22, 24 divided by a partition 26. Each chamber 22, 24 may include a stirrer 27. The membrane 28 is positioned over an opening in the partition 26. The chamber 22 is loaded with a metal salt solution ($FeCl_2$, $K_2PdCl_4$, etc.) while the other chamber 24 is loaded with a green reducing and capping agent solution.

The solutions diffuse inside membrane pores because of the concentration gradient and react at pore interface where the metal ion and the reducing agent meet. In this processing setup the nanoparticles are formed in the membrane pores only. Thus, the diffusion mode approach is highly selective for synthesis of nanoparticles within membrane pores. For example in the case of Fe nanoparticles a solution of $FeCl_2$ (0.25 mL, 50-100 mg/L $Fe^{2+}$) is fed in one chamber and the reducing agent (ex. tea extract or epicatechin) in the other, the nanoparticles with an average size of 30 nm are formed inside of the pores and the diffusive fluxes are determined by the concentration of the metal salt and reductant used. When nanoparticle formation is observed in either chamber (black color in the solution), the process is stopped. For bimetallic nanoparticles, a second step consists of filling the chambers with palladium salt (ex. $K_2PdCl_4$) on one side and the reducing agent in the other. The Pd salt concentration is variable, depending on the amount desired to be deposited on previously reduce Fe nanoparticles (for our purposes this is in the range from 3 to 5 wt % Pd of total metals).

The following examples are presented to further illustrate the nanocomposite membranes and the method of making those membranes.

Example 1

Materials

All chemicals used were of reagent grade. Trichloroethylene (TCE), ferrous chloride, and deionized ultrafiltered (DIUF) water were all purchased from Fisher Scientific. Potassium persulfate was purchased from EM Science, acrylic acid, potassium tetrachloropalladate (II), sodium borohydride and 1, 2-dibromoethane (DBE) were purchased from Sigma-Aldrich. Chloride reference solution (100 ppm) was purchased from Thermo Electron Corporation and ethylene glycol (EG) from Mallinckrodt. Hydrophilized PVDF microfiltration membranes, with a thickness of 125 μm and nominal pore size of 650 nm were obtained from Millipore Corporation.

Methods

PAA Functionalization of Membrane

PVDF membranes were functionalized with poly(acrylic acid) by in situ polymerization of acrylic acid. The polymerization reaction was carried out in aqueous phase and the polymerization solution contained 40 mL deoxygenated DIUF water, the initiator potassium persulfate (0.6 g, ~1% wt.), 20 mL acrylic acid and 1 mL cross-linking agent ethylene glycol. This corresponds to 6.15 mol % EG to acrylic acid molar ratio and the ether bond formed between carboxylic group and EG generate the cross-linking PAA network structure. EG is a bidentate ligand and binds to carboxylic acid groups in a 1:2 molar ratio; it is important to only do a partial (about 12.3% under our experimental conditions) cross-linking to leave free carboxylic groups (87.7%) for metal entrapment. The PVDF membrane was dipped in the polymerization solution for 2 minutes, sandwiched between two teflon plates and placed in an oven at 90° C. for 4 hours. Nitrogen gas was continuously supplied to remove the oxygen, which acts as an inhibitor for the polymerization reaction. In order to ensure the proper wetting, hydrophilic PVDF membranes were used for the aqueous phase polymerization.

Fe and Bimetallic Fe/Pd Nanoparticle Synthesis in PAA Functionalized PVDF Membranes The flowchart for membrane functionalization and nanoparticle synthesis is shown in FIG. 1. Prior to $Fe^{2+}$ ion exchange, PAA-functionalized PVDF membranes were immersed in NaCl (5 to 10% wt) solution at pH 10 (adjusted with 0.1M NaOH) for at least 3 h to convert the —COOH to COONa form. In the next step, the membrane was washed with DIUF water until the pH of the washing solution became neutral. Then, the membrane was immersed in $FeCl_2$ solution at a pH of 5.5 (adjusted with 0.1M NaOH) for 4 h. Typically the feed solution volume and concentration were 200 mL and 180 mg/L $Fe^{2+}$, respectively. Nitrogen gas was bubbled to minimize $Fe^{2+}$ oxidation. The $Fe^{2+}$-modified membrane was immersed in green tea extract (50 ml, 20 g/L) at pH 5, this ensured the formation of Fe nanoparticles. The green tea extract was prepared by immersion of 4 g dry green tea leafs in boiling water (200 mL) for 30 minutes; the liquid was filtered using 1) a filter paper and 2) a 200 nm microfiltration (regenerated cellulose) membrane. Fe nanoparticles were also prepared using sodium borohydride (typically 50 mL, 10 g/L) as a reducing agent, instead of the tea extract.

For the Fe/Pd bimetallic nanoparticles, the secondary metal, Pd, was deposited on the Fe nanoparticles by immersing the membrane (typically for 2 h) in a $K_2PdCl_4$ solution (20 mL, 25 mg/L Pd in a mixture of ethanol/water 90:10 vol %). This was performed in closed vials with vigorous shaking.

Metal Analysis

The amount of Fe captured during ion exchange and Pd deposited on the Fe-modified membrane was determined from material balance. In addition, membranes (after the dechlorination studies were completed) were digested by immersion in nitric acid (0.02 L, 35%) thus desorbing the metals in the solution phase. The concentrations for Fe and Pd in the feed, permeate and digested solutions were quantified using a Varian SpectrAA 220 Fast Sequential atomic absorption spectrometer equipped with a Fisher Scientific hollow cathode lamp. For Fe, the lamp was operated at a wavelength of 386.0 nm. The calibration plot was created using 4 different concentrations of Fe ranging from 25 to 200 mg/L with $R^2=0.9995$ and average analytical error of 2%. In the case of Pd, the lamp was operated at a wavelength of 246.6 nm and the linear calibration range is between 0.2 and 28 mg/L Pd. The error of analysis was <2%.

TCE Degradation Analysis

Dechlorination of TCE was conducted by cutting PAA/PVDF membranes containing Fe or Fe/Pd nanoparticles (original membranes were of 13.2 $cm^2$ external area and 125 μm thickness) into small pieces and immersing them in 20 mL sealed vials containing TCE (30 mg/L) solution. Probes were collected with a syringe at different times. TCE samples were extracted in pentane, and analyzed with a Hewlett Packard Series II 5890 GC-MS. In this analysis, the decrease of TCE concentration in time was monitored and EDB was used as an internal standard. The calibration was performed in between 5 and 50 mg/L TCE, linear $R^2=0.9899$, and the average analytical error was <8.5%.

TCE was also dechlorinated under convective conditions; for this case the PAA/PVDF membrane containing Fe/Pd nanoparticles was mounted in a filtration cell and a feed solution (0.2 L, 30 mg/L TCE) was permeated through the membrane. Instead of measuring the TCE (volatile) concentration in the permeate solution directly, the concentration of $Cl^-$ in the permeate solution was measured using an Accumet combination chloride electrode. Then, based on the assumption of a total dechlorination (1 degraded mol of TCE releases 3 moles of $Cl^-$) this was used to back calculate the concentration of TCE in the permeate solution.

Results and Discussion

Fe and Fe/Pd Nanoparticle Synthesis and Characterization

The procedure for membrane modification and nanoparticle incorporation was described in previous section. Tea extract contains a number of polyphenols, the most common one being epicatechin or its ester forms with gallic acid. Polyphenols can directly complex and then reduce iron to zero valent particles. For example, the reduction potential for epicatechin is 0.57 V, sufficient for the reduction of $Fe^{2+}$ to $Fe^0$ (−0.44 V).

A general reaction can be written as:

$$n Fe^{2+} + 2Ar\text{—}(OH)_n \longrightarrow n Fe^0 + 2nAr\text{=}O + 2nH^+,$$

where Ar is the phenyl group and n is the number of hydroxyl groups oxidized by $Fe^{2+}$.

After the immersion of $Fe^{2+}$-modified membrane in the green tea extract, the membrane changes color from white to black (due to the formation of $Fe^0$ nanoparticles on the membrane). The nanoparticle size can be controlled by adjusting PAA cross-linking in pores and by modification of reductant to exchanged metal ratio. For comparison purposes, Fe and Fe/Pd nanoparticles were also synthesized using the conventional hydride reducing reagent, sodium borohydride. For the Fe/Pd bimetallic nanoparticles, the secondary metal, Pd, was deposited by post-coating reaction of Fe with $K_2PdCl_4$ solution.

Figure 4:
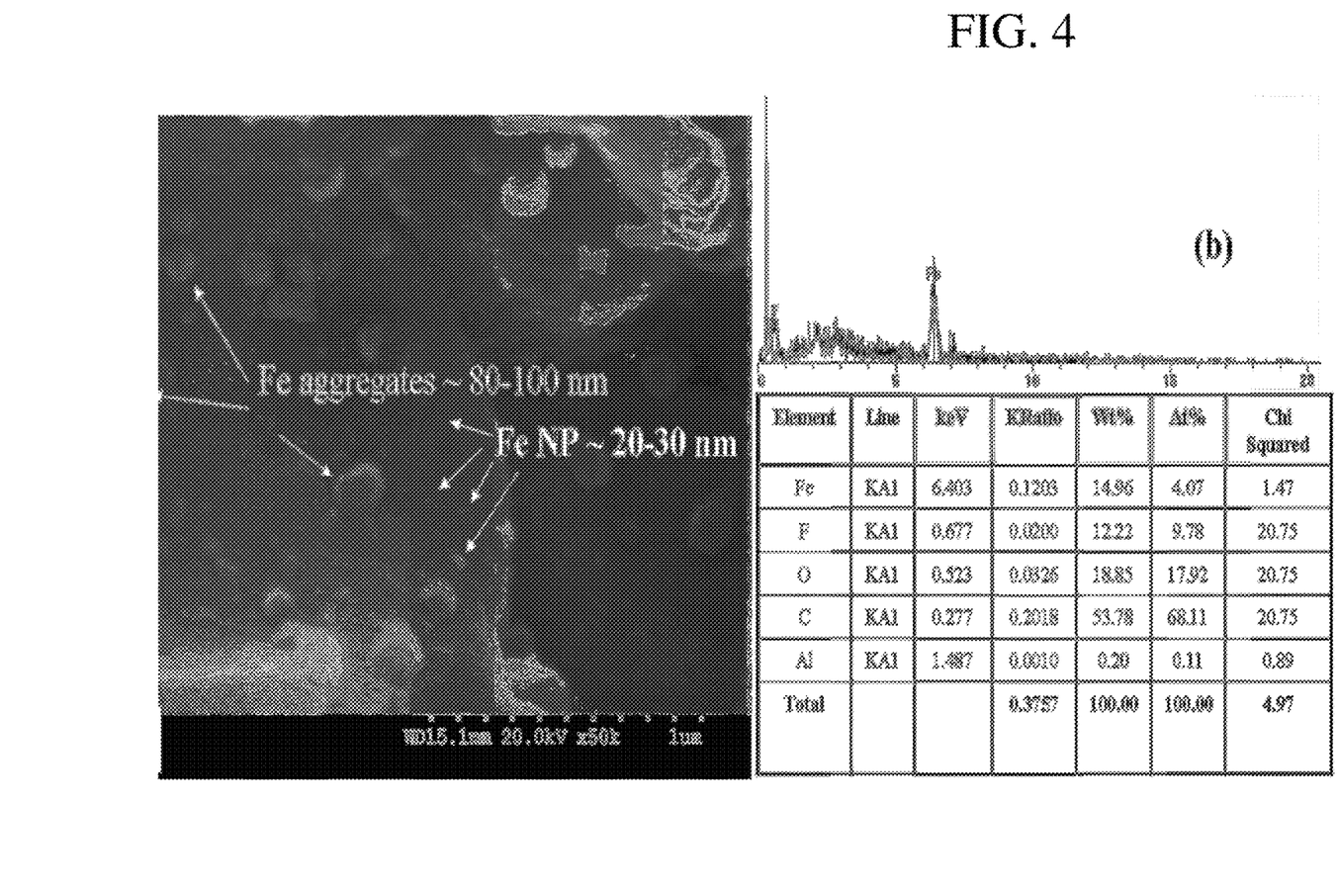
FIG. 4 is a SEM image for Fe nanoparticles (reduced using tea polyphenols) immobilized on a PAA/PVDF membrane (cross-section) and the related EDX spectrum.
Figure 5:
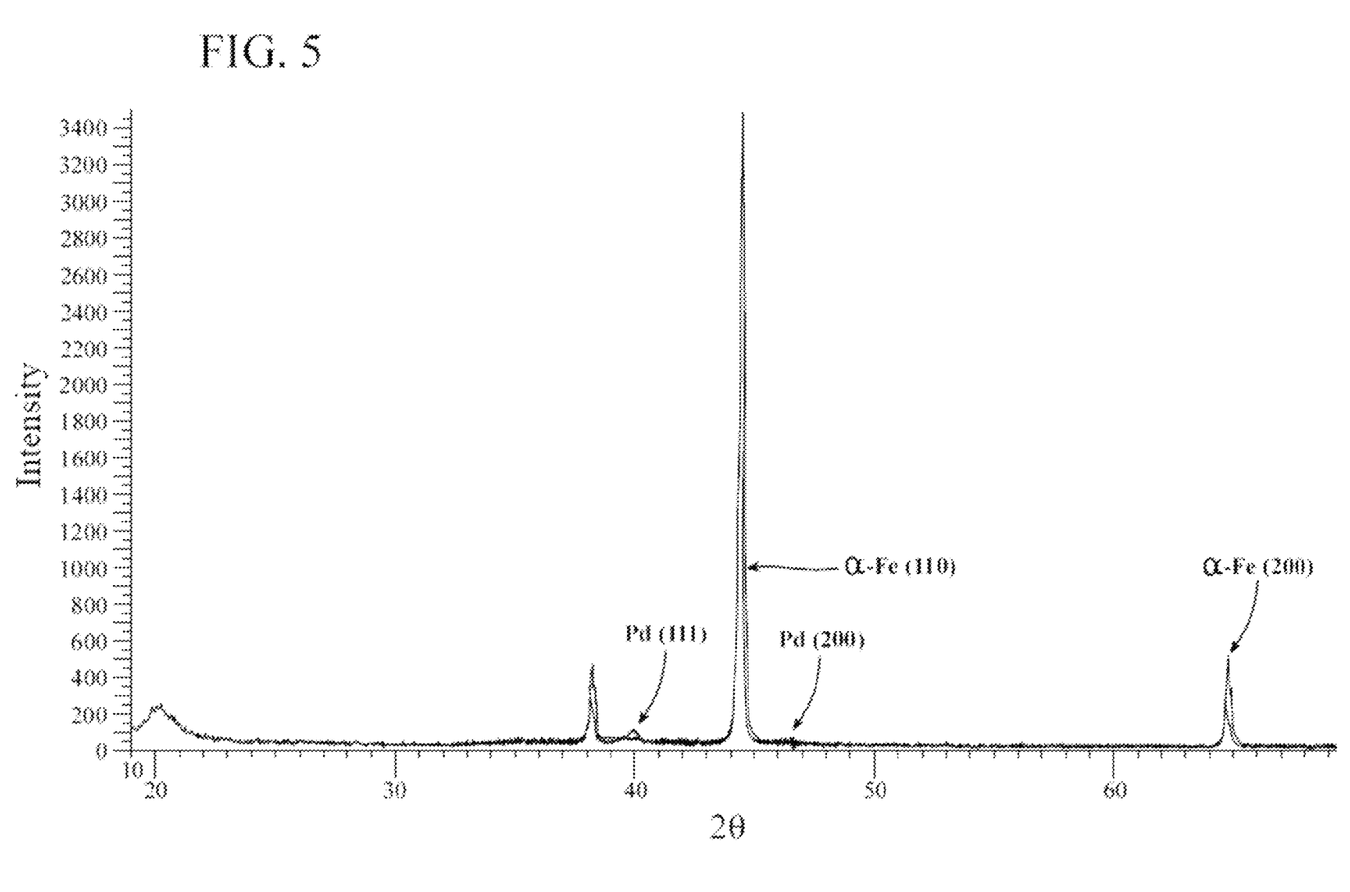
FIG. 5 is a XRD spectra for Fe and Fe/Pd nanoparticles reduced with tea extract.

An SEM image for the cross-section of the PVDF/PAA membrane containing Fe nanoparticles is shown in FIG. 4a. It can be observed that the base nanoparticles are in the range from 20 to 30 nm and there are also some aggregates, between 80 and 100 nm. The Energy Dispersive X-ray (EDX) spectrum (FIG. 4b) confirms the presence of Fe and quantitative elemental analysis shows an atomic ratio Fe:O of approximately 1:4. One would expect most of the "O" is from the COO groups of polyacrylic acid. Nanoparticle XRD pattern (FIG. 5) indeed shows iron to be in the metallic α-Fe form ((110), (200)) and Pd ((111) and (200)) peaks.

TCE Dechlorination Studies

The Fe and bimetallic Fe/Pd nanoparticles have been used to dechlorinate toxic organics, trichloroethylene (a common pollutant in groundwater) being used as a model compound. It is well known that dechlorination by Fe nanoparticles, occurs via electron transfer mechanism whereas in the Fe/Pd bimetallic system Fe generates $H_2$ and Pd acts as a catalyst (the dechlorination occurs on Pd surface).

Fe Nanoparticles

Figure 6:
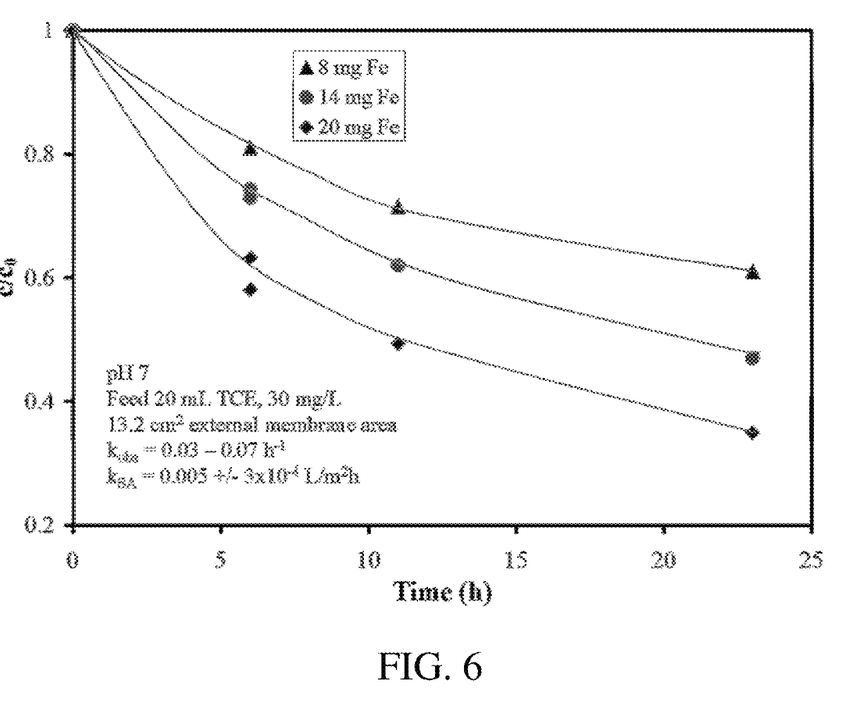
FIG. 6 is a graphical representation of trichloroethylene (TCE) dechlorination using Fe nanoparticles immobilized on PAA/PVDF membrane using tea polyphenols as a reducing agent.

The dechlorination performance for three membranes containing immobilized Fe nanoparticles is shown in FIG. 6. Some points were taken in duplicate, these were separate experiments (another cycle) showing a good reproducibility and stability (no nanoparticle deactivation observed). As expected, the rate of degradation increases linearly with increasing Fe loading. The surface normalized rate constant $k_{SA}$ can be written as: $dC/dt = k_{obs} C = k_{SA} a_S \rho_m C$, where "$a_S$" is the specific surface area of the nanoparticles ($m^2/g$), $\rho_m$ is the nanoparticle loading (g/L). The specific surface area was determined to be 25 $m^2/g$, assuming discreet, spherical nanoparticles (30 nm diameter, as observed by SEM imaging). For three different loadings $k_{SA}$ was approximately constant, the average value was 0.005 $L/m^2$ h and the standard deviation ~5%.

In order to ensure that TCE concentration decrease is due to reaction and not other processes such as evaporation (TCE is volatile) or physical adsorption on the membrane, control experiments were conducted. The same feed of TCE (30 mg/L 0.02 L) in the presence of tea extract (20 g/L) was shaken in a gas tight vial without the membrane; TCE samples were taken after 5, 10 and 24 h, respectively. The concentration of TCE was within 5% of the original value, showing that the evaporation does not play a significant role in TCE concentration decrease observed in dechlorination experiments. Secondly, the whole membrane was extracted in pentane and analyzed by GC-MS; no TCE was detected. As a consequence, it can be assumed that TCE concentration decrease observed during dechlorination studies is entirely due to reaction with Fe nanoparticles. In addition, dechlorination experiments were conducted with "real" water taken from a contaminated site in Paducah Ky.; this water contains among others (82 mg/L alkalinity, 293 mg/L total dissolved solids and 1.2 mg/L turbidity), a more detailed description of the water quality can be found in literature [47]. For the same feed concentration of TCE (30 mg/L), the discrepancy between the dechlorination results in "real" and DIUF water was within 5%. This shows a minimal impact of the matrix present in the contaminated site on dechlorination, and that our systems can be applied in the "real world".

Fe/Pd Nanoparticles and Reaction Rate Evaluations

Figure 7:
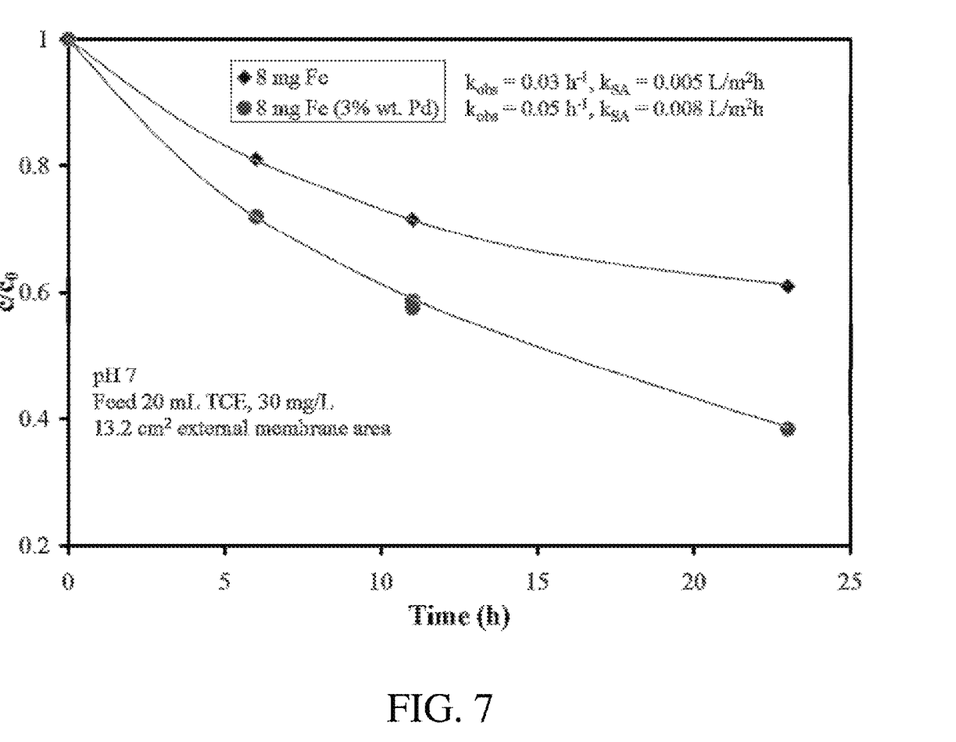
FIG. 7 is a graphical illustration of a TCE dechlorination using Fe and Fe/Pd nanoparticles immobilized on PAA/PVDF membrane using tea polyphenols as a reducing agent.
Figure 8:
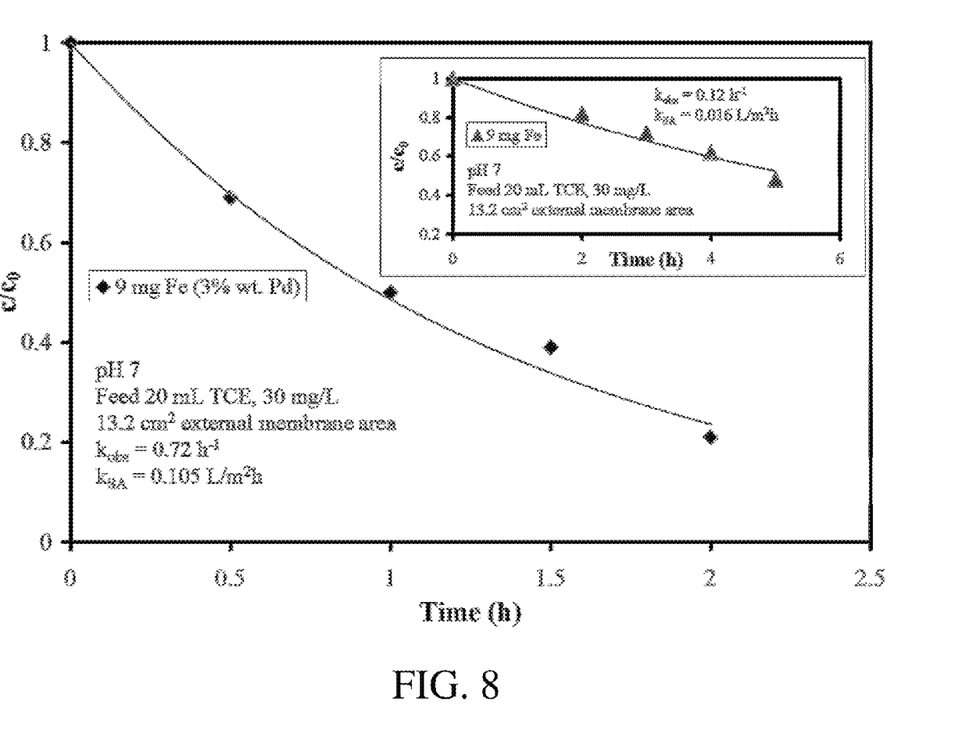
FIG. 8 is a TCE dechlorination using Fe and Fe/Pd nanoparticles immobilized on PAA/PVDF membrane, using sodium borohydride ($NaBH_4$) as a reducing agent.

It is well known that the addition of a secondary metal increases the dechlorination performance as shown in FIG. 7. A PVDF/PAA membrane containing 8 mg Fe nanoparticles was used in dechlorination studies then it was post-coated with Pd (3 wt %. as of Fe) and the dechlorination experiment was repeated. The addition of a secondary metal led to almost a two-fold increase in $k_{SA}$ value, from 0.005 to 0.008 $L/m^2$ h. It is known that dechlorination performances by Fe and Fe/Pd nanoparticles (reduced by borohydride) in homogeneous phase, there is a more significant increase for the $k_{SA}$ of the two systems, at least 1 order of magnitude. However, since there is no data available for supported Fe and Fe/Pd nanoparticles on PVDF/PAA membranes, these were also synthesized (for comparison purposes) using sodium borohydride as a reducing agent. The dechlorination studies indeed showed a much higher discrepancy (one order of magnitude) in $k_{SA}$ value for the Fe vs Fe/Pd systems (FIG. 8). Due to the fact that the tea extract acts as both reducing and capping agent, some of the Fe nanoparticle surface becomes unavailable for Pd deposition using post-coating. As a consequence, Pd has a much smaller effect on dechlorination by Fe/Pd vs Fe nanoparticles, when reduced by the tea extract as opposed to sodium borohydride. Also the $k_{SA}$ values for both Fe and Fe/Pd systems were lower when reduced by tea extract (as mentioned before, 0.005 and 0.008 $L/m^2$ h, respectively) compared to the case when sodium borohydride was the reducing agent (0.016 for Fe and 0.105 $L/m^2$ h for Fe/Pd).

Figure 9:
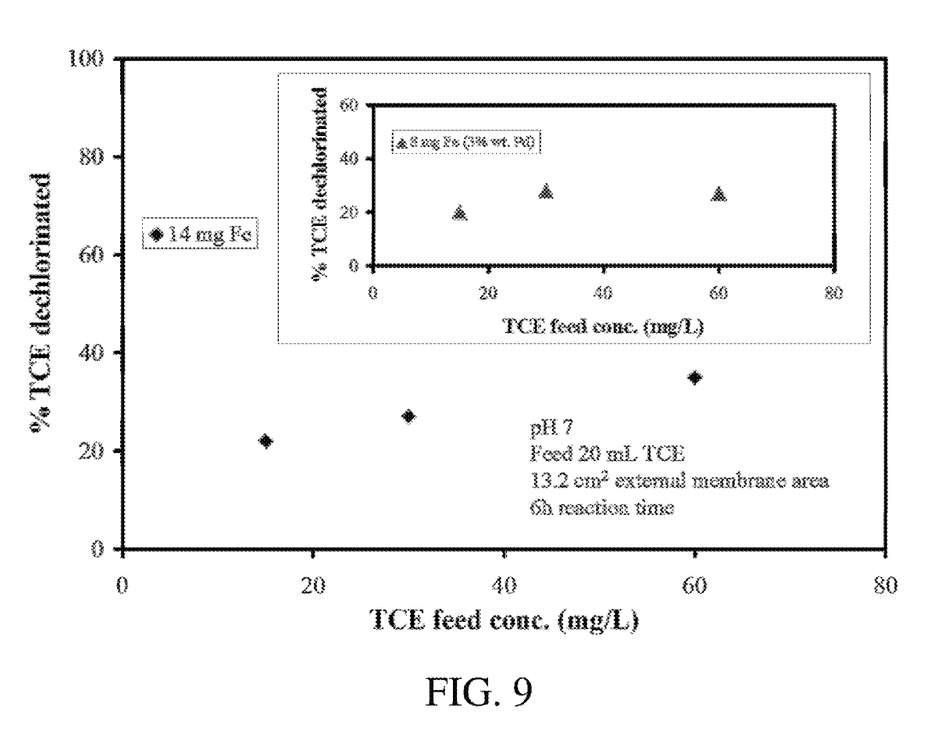
FIG. 9 is a graphical illustration of the effect of feed concentration on TCE dechlorination using Fe nanoparticles (reduced by tea extract) immobilized on PAA/PVDF membrane.

The kinetic parameters were calculated assuming a pseudo first order kinetics (i.e. the rate of dechlorination depends only on the metal loading). In order to prove the validity of this assumption, it was important to determine the effect of the feed TCE concentration on dechlorination rates. FIG. 9 shows a plot of the TCE conversion on Fe and Fe/Pd nanoparticles (for 6 h reaction time) at different feed TCE concentrations. The conversion does not change much (<20% change) over the feed concentration examined, showing that pseudo first order assumption can be used for kinetic data processing.

Use of Convective Flow (Residence Time Variations)

Another very important aspect of the membrane supported nanoparticles is its ability to be deployed under convective flow conditions. This was tested for one of the membranes, Fe/Pd (11.2 mg Fe, 3 wt % Pd as Fe) reduced with borohydride. For this experiment, the membrane was mounted in a filtration cell and a solution of TCE (30 mg/L) was passed through. Under convective conditions, 27% TCE dechlorination was attained for 1.1 min residence time in the membrane (flux of $1.6 \times 10^{-4}$ $cm^3/cm^2$ s at 11.7 bar). The residence time was calculated as $\tau = V/(AJ_v)$, where V is the membrane volume, A is the external area (13.2 $cm^2$), and $J_v$ is the permeation flux ($cm^3/cm^2/s$). Also, $V = \epsilon AL$, where $\epsilon$ is the porosity (70% on average, from manufacturer's data) and L is the membrane thickness (125 µm). Using this residence time, the rate constant, $k_{obs}$ and $k_{SA}$ was determined. Assuming CSTR the values were 19.8 h$^{-1}$ ($k_{obs}$) and 1.32 L/m$^2$ h ($k_{SA}$), respectively. This shows that operation under convective conditions can eliminate diffusion limitations (as in the case of batch mode operation).

Nanoparticle Longevity and Fe Recapture

Figure 10:
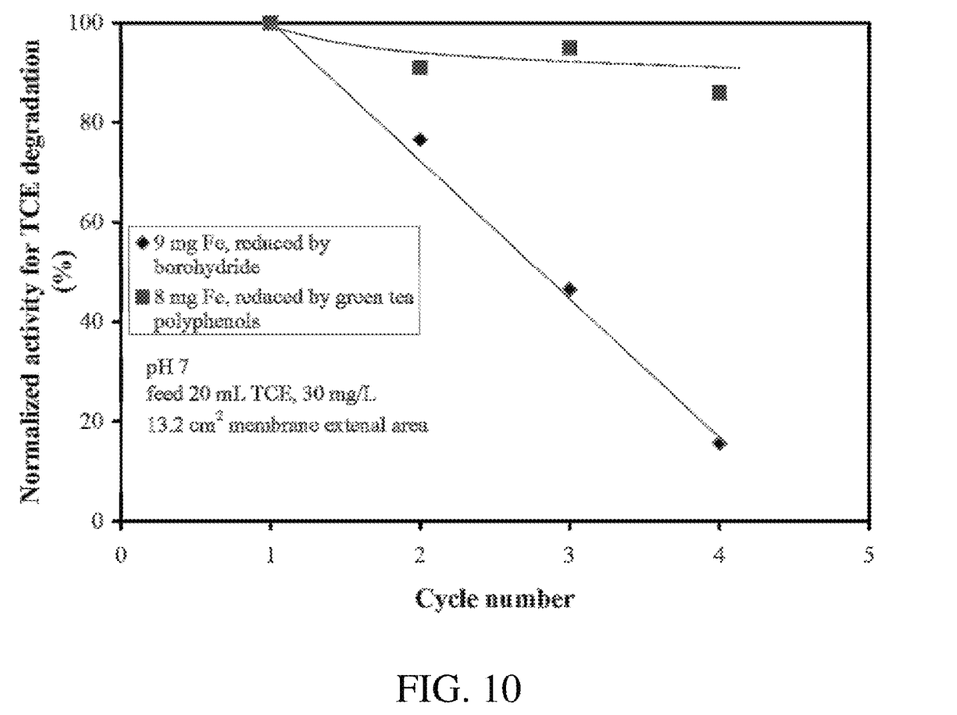
FIG. 10 is a graphic illustration of a normalized TCE dechlorination (vs first cycle) for Fe nanoparticle-immobilized on PAA/PVDF membranes reduced by sodium borohydride and tea extract.

However, a major benefit of using tea extract (epicatechin) type capping agents is to minimize Fe oxidation and to maintain particles in non-agglomerated form without loss of activity. It is well studied that the aging of the Fe nanoparticles (reduced with borohydride) occurs not only due to dechlorination, but also due to the presence of common groundwater dissolved constituents, including oxygen. Initially, all four membranes were black. During the experiments, the Fe membrane reduced by borohydride showed the most pronounced oxidation (orange color). This was followed by the Fe/Pd membrane (also reduced by borohydride), showing dark brown spots. On the other hand, both Fe and Fe/Pd membranes treated with tea extract retained the black color even after much longer reaction times (23 h vs 2 or 5) and multiple cycles. Moreover, in order to study the long term stability, one membrane (8 mg Fe reduced with tea extract) was stored in water and tested periodically over a period of 3 months and it showed dechlorination rates similar (within 15%) with the initial value. This trend is shown in FIG. 10. Moreover, for the case of borohydride reduced Fe nanoparticles, the activity decreases to less than 20% of the initial value after only 4 cycles.

It is also important to mention that Fe$^0$ (the reactant) oxidizes to Fe$^{2+}$/Fe$^{3+}$ during dechlorination, and it is recaptured by the membrane-bound carboxylic acid groups on the membrane. Experimental verification by Fe analysis indeed showed no loss. This can be potentially regenerated back to the metal form by reducing agents. In contrast to homogeneous phase nanoparticles applications, this approach provides no loss of NPs and soluble iron in the solution phase.

Example 2

The nanoparticles were synthesized in a diffusive cell with two chambers separated by the membrane. One chamber contained a mixture of FeCl$_3$ and Ascorbic Acid and the other K$_2$PdCl$_4$. The solutions diffused in the membrane pores and Fe and Pd ions were simultaneously reduced to Fe/Pd nanoparticles in the presence of Ascorbic Acid. The major difference between this approach and the one described in Example 1 is that the nanoparticles are formed only in the membrane pores, as opposed to both membrane external surface and pores (in Example 1).

Numerous benefits result from employing the concepts disclosed herein. Nanoparticles are directly synthesized in-situ within the pores of a membrane without aggregation and loss. Further, nanoparticle synthesis is achieved without any complicated, time consuming and potentially yield reducing separation steps as required for solution based nanoparticle synthesis systems.

What is claimed:

1. An apparatus, comprising:
a macroporous polymer membrane including a plurality of polyacrylic acid (PAA)-functionalized pores and
a plurality of green capped and reduced metal nanoparticles entrapped and immobilized in situ by functionalized polyacrylic acid of said plurality of PAA-functionalized pores, said plurality of green capped and reduced metal nanoparticles comprising catalytically active bimetallic nanoparticles.

2. The apparatus of claim 1 wherein said plurality of green capped and reduced metal nanoparticles are reduced by contact with a green reducing and capping agent selected from a group consisting of green tea extract, polyphenol, epicatechin, epicatechin gallate, epigallocatechin, rutin, tannic acid, D-glucose, glutathione, ascorbate, kaempferol, quercetin, myricetin, maltose and mixtures thereof.

3. The apparatus of claim 2, wherein said green reducing and capping agent is green tea extract.

4. The apparatus of claim 1 wherein each nanoparticle of said plurality of green capped and reduced nanoparticles has a size of between about 30 nm and about 70 nm.

5. The apparatus of claim 4, wherein between about 70 and about 80 percent of said nanoparticles immobilized on said membrane are inside said plurality of pores, as compared to the surface of the membrane.

6. The apparatus of claim 1, wherein said plurality of PAA-functionalized pores have diameters of between about 100 nm and 700 nm.

7. The apparatus of claim 3, wherein said green tea extract reducing and capping agent comprises polyphenols.

8. An apparatus, comprising:
a macroporous polymer membrane including a plurality of polyacrylic acid (PAA)-functionalized pores; and
a plurality of reduced and green capped bimetallic nanoparticles entrapped and immobilized in situ by functionalized polyacrylic acid within said plurality of pores, said nanoparticles reduced and capped in situ with a green reducing and capping agent;
said apparatus being made by directly synthesizing and immobilizing said plurality of reduced and green capped bimetallic nanoparticles in-situ in said plurality of PAA-functionalized pores using said green reducing and capping agent while operating in diffusion mode.

9. The apparatus of claim 8, wherein each nanoparticle of said plurality of nanoparticles has a size of between about 30 nm and about 70 nm.

10. The apparatus of claim 9, wherein between about 70 and about 80 percent of said nanoparticles immobilized on said membrane are inside said plurality of pores.

11. The apparatus of claim 10, wherein said reduced and green capped bimetallic nanoparticles are made from a material selected from a group consisting of Fe/Pd, Fe/Ni, Fe/Cu, Fe/Pt, Fe/Ag and mixtures thereof.

12. The apparatus of claim 10, wherein said membrane is made from a material selected from a group consisting of polyacrylic acid-modified polyvinylidene fluoride, polysulfone, cellulose-based materials and polycarbonate.

13. The apparatus of claim 12, wherein said plurality of pores have diameters of between about 100 nm and 700 nm.

14. The apparatus of claim 8, wherein said green tea derived reducing and capping agents comprise polyphenols.

15. A method of preparing a nanocomposite membrane, comprising:
functionalizing pores of a macroporous polymer membrane with polyacrylic acid (PAA);
passing a first metal salt solution and a first reducing solution through the PAA functionalized pores by diffusion or convection, thereby synthesizing, entrapping and immobilizing a plurality of metal nanoparticles in-situ within functionalized polyacrylic acid of the PAA functionalized pores;
passing a second metal solution and a second reducing solution through the PAA functionalized pores by diffusion or convection to deposit a second metal on the plurality of metal nanoparticles, thereby forming bimetallic nanoparticles; and
using a green reducing and capping agent to cap the bimetallic nanoparticles.

16. The method of claim 15 including:
 immobilizing cations of precursor salts on the membrane; and
 diffusing a green reducing and capping agent through the membrane pores.

17. The method of claim 16 including using a macroporous polymer membrane made from a material selected from a group consisting of polyvinylidene fluoride, polysulfone, cellulose-based materials and polycarbonate.

18. The method of claim 17, wherein the bimetallic nanoparticles comprise Fe/Pd, Fe/N, Fe/Cu, Fe/Pt, Fe/Ag or mixtures thereof.

19. The method of claim 16, including using a macroporous polymer membrane made of polyacrylic acid-modified polyvinylidene fluoride and making said plurality of nanoparticles from Fe/Pd bimetallic material.

20. The method of claim 19, including immobilizing at least 70% of said nanoparticles immobilized on said membrane within said plurality of pores.

* * * * *